United States Patent [19]

Chapman

[11] 4,397,438
[45] Aug. 9, 1983

[54] SELECTIVELY MOUNTABLE ARTICLE HOLDING FASTENER

[75] Inventor: Michael C. Chapman, Rolling Meadows, Ill.

[73] Assignee: Illinois Tool Works Inc., Chicago, Ill.

[21] Appl. No.: 226,303

[22] Filed: Jan. 19, 1981

[51] Int. Cl.³ .............................................. F24H 9/06
[52] U.S. Cl. ................................. 248/229; 70/456 R; 248/226.5; 248/316 D; 248/DIG. 11
[58] Field of Search ............ 70/456 R; 248/DIG. 11, 248/229, 316 D, 345.1, 226.5, 224.4; 24/3 K, 3 L, 3 J; 52/821, 823, 824

[56] References Cited

U.S. PATENT DOCUMENTS

| | | | |
|---|---|---|---|
| 533,024 | 1/1895 | Smith | 248/229 X |
| 884,256 | 4/1908 | Addie | 248/316 D |
| 2,728,501 | 12/1955 | Hill | 70/456 R |
| 2,869,812 | 1/1959 | Hamel | 248/226.5 X |
| 3,090,826 | 5/1963 | Cochran | 248/68 R X |
| 3,193,229 | 7/1965 | Stock | 248/229 X |
| 3,360,883 | 1/1968 | Glanzer | 403/171 X |
| 3,366,356 | 1/1968 | Fisher | 411/511 X |
| 3,521,332 | 6/1970 | Kramer | 248/229 X |
| 3,680,818 | 8/1972 | Bujnowski et al. | 248/73 |
| 3,807,675 | 4/1974 | Seckerson et al. | 248/223.4 X |

FOREIGN PATENT DOCUMENTS

| | | | |
|---|---|---|---|
| 732949 | 4/1966 | Canada | 70/456 R |
| 630880 | 4/1963 | France | 248/316 D |

*Primary Examiner*—James T. McCall
*Assistant Examiner*—David L. Talbott
*Attorney, Agent, or Firm*—Jerold M. Forsberg; Thomas W. Buckman

[57] ABSTRACT

A clip type fastener for attachment to a mounting or supporting element, as the handle of a toolbox or toolbox drawer, for wedgingly receiving an article, as a key for the toolbox lock, in accessible position to insert or remove the same relative to a mounting recess in the fastener body portion from which spaced legs extend in directions for selectively and resiliently gripping mounting or support elements, as handles, of different cross-sectional configurations; outer legs being adapted for snap engagement and mounting on the web portion of a formed angle or beam type, as a T-angle, mounting element or handle with an intermediate leg acting as a strut against the web portion for properly positioning the fastener thereon; and with an outer leg and an intermediate leg adapted for snap engagement and mounting on a handle or other supporting element of generally uniform cross-section, as an extruded aluminum element, for properly positioning the fastener thereon.

9 Claims, 7 Drawing Figures

U.S. Patent        Aug. 9, 1983        4,397,438
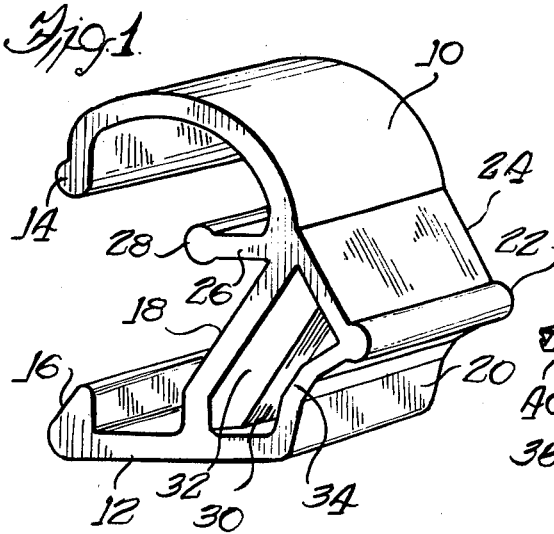
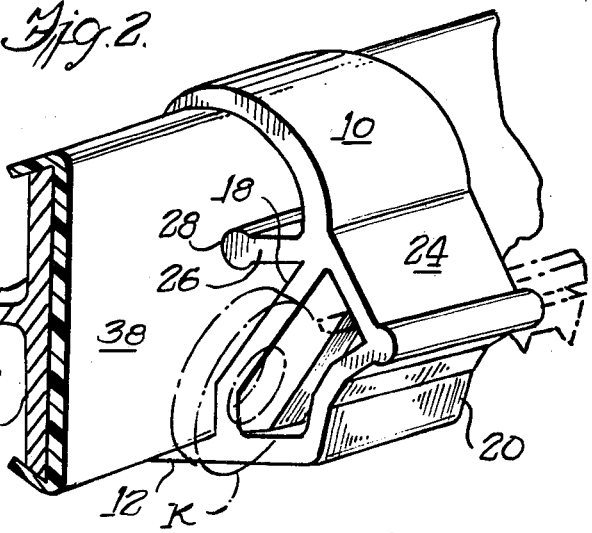
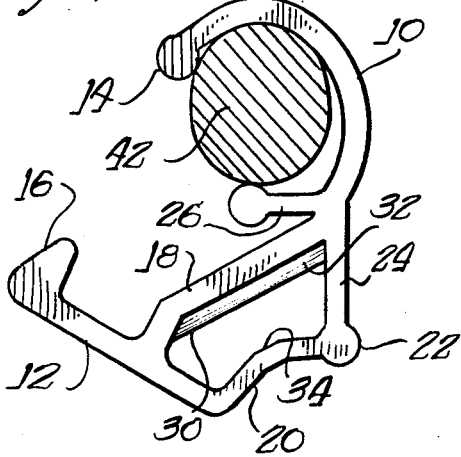
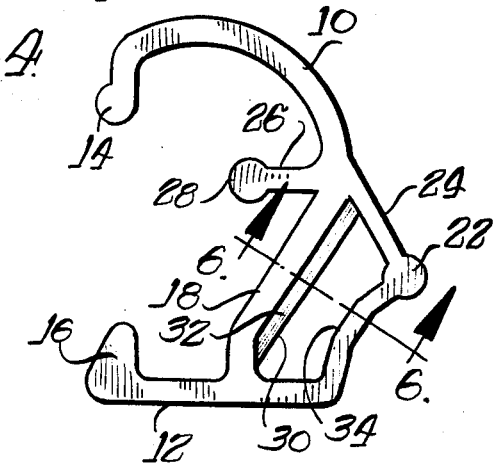
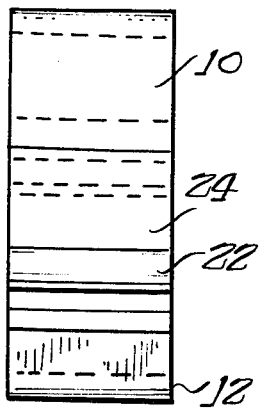
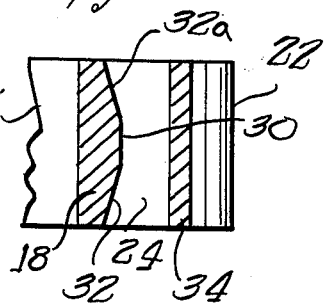
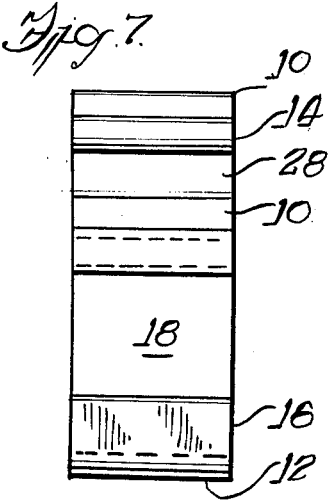

SELECTIVELY MOUNTABLE ARTICLE HOLDING FASTENER

BACKGROUND OF THE INVENTION

The invention relates to a key holding clip type fastener adapted for attachment to a supporting element such as a handle on a toolbox or toolbox drawer and including a recess for wedgingly mounting a key in accessible position.

In general, keys for the locks of toolboxes have been retained in association with the toolbox by a wire or string passed through the aperture in the key body and twisted or tied around the toolbox handle, or the keys have been placed in a bag or envelope which may be similarly attached to the toolbox handle. Such attachment methods are time consuming and may interfere with packing of the toolboxes in cartons. In other environments, clip type fasteners have been used for attachment to a supporting element and including recesses or other resilient means for additionally mounting a separate element or group of articles, as in Cochran U.S. Pat. No. 3,090,826 for a wiring support; Stock U.S. Pat. No. 3,193,229 for a light string hangar; Glanzer U.S. Pat. No. 3,360,883 for a construction toy connector; Fisher U.S. Pat. No. 3,366,356 for a rod support; Bujnowski et al. U.S. Pat. No. 3,680,818 for a pipe support; Seckerson et al. U.S. Pat. No. 3,807,675 for a pipe or cable support.

SUMMARY OF THE INVENTION

According to the present invention, there is provided a clip type fastener with a body portion having a key holding recess and mounting legs extending from the body portion is positioned opposition for engaging a supporting element, as a toolbox handle, and mounting the key holding recess in accessible position without entanglement or substantial interferences with a shipping or storage carton therefor.

An object of the invention is to provide such a clip type fastener for wedgingly mounting a key or the like in the recess and in readily accessible position for insertion or removal thereof.

Another object of the invention is to provide such a fastener with spaced legs for resiliently mounting the fastener on supporting elements, as handles, of various cross-sectional configurations and dimensions.

A further object of the invention is to provide a mounting fastener of the above type having plural mounting legs with selective pairs of legs employed for mounting the fastener on supporting elements of different configurations.

The above and other objects of the invention will, in part, be obvious and will be hereinafter more fully pointed out in the description of the drawings of which FIG. 1 is a perspective view of the fastener;

FIG. 2 is a perspective view of the fastener applied to a formed angle type supporting element shown in fragmentary section;

FIG. 3 is an end elevation of the fastener applied to a supporting element of circular cross-section;

FIG. 4 is an end elevation of the fastener;

FIG. 5 is a rear elevation of the fastener;

FIG. 6 is a fragmentary section taken along the line 6—6 of FIG. 4, and

FIG. 7 is a front elevation of the fastener.

The fastener may be formed of suitable material as, for example, extruded metal or plastic having sufficient residual resiliency in certain areas to properly grip the mounting element and inserted key or the like as will become apparent from the following description with reference at this time to FIGS. 1 and 4. The fastener body includes upper and lower legs of arms 10, 12, respectively, which are spaced apart in gripping opposition to each other and which terminate along the free edges thereof with flange or bead portions 14, 16, respectively, extending generally toward one another. Within the fastener body, the legs 10 and 12 are connected by an inner web portion 18 and an outer web or strap portion 20 which latter is connected through a bead portion 22 with a surface portion 24 in turn connected and forming a continuation of the upper leg 10. There is an intermediate leg or arm 26 with a beaded terminal edge 28. This leg is intermediate the legs 10, 12 and is shorter in length for a dual function to be pointed out below.

The inner web portion 18 is provided with a central transverse raised portion 30 at the inner extremities of two ramp surfaces 32, 32a (for the latter see FIG. 6) inclining upwardly and inwardly from the adjacent transverse edges of the web portion 18. The outer web or strap portion 20 is inclined inwardly from the top and bottom longitudinal edges thereof to present an inwardly disposed longitudinal bearing surface 34 for assisting in wedging a key K against the raised portion 30 on the web 18, as shown in broken lines in FIG. 2. The ramp surfaces 32, 32a provide for easy insertion of a key into wedging engagement with the raised portions 30, 34 within the key receiving recess defined by the webs 18, 20, the inclined surface 24 and the bottom adjacent part of the arm or leg 12. Thus, the key or other appropriate article can be inserted in or removed from the recess at either end opening thereof and there is sufficient relative resiliency between the parts, as the webs 18, 20, to permit such insertion and wedging grip on the inserted key or the like.

One type of handle or supporting element is shown in FIG. 2 as a formed angle member such as a T-angle with a web 36, which may be covered with a plastic or like channel 38, extending from a central portion 40. The clip type fastener is shown mounted to this type of handle or supporting element with the legs or arms 10, 12 overlying the edges of the covered handle web 36 and resiliently sprung apart during engagement therewith leaving the shouldered or flange portions 12, 16 snugly engaged behind the upper and lower edges, respectively, of the web 36. With this or similar types of formed angle handles or other supporting elements, the intermediate leg 26, with its beaded edge 28, bears against the central portion of the handle web as a strut or spacing member to properly position the fastener with the legs 10, 12 tightly gripping the handle and with the key K supported without interference with the handle or other supporting element. In the mounted position of the fastener, additional spaces are provided between the handle and the inner surfaces of the legs 10, 12 above and below the intermediate strut leg 26 for receiving additional articles the purchaser may find advantageous.

Another type of handle or supporting element is shown in FIG. 3 as, for example, an extruded aluminum bar 42 type of circular or other uniform cross-section. The fastener is shown mounted on this type of handle or other supporting element gripped between the upper leg 10 and the intermediate leg 26. In this resiliently gripped and mounted position, the intermediate leg 26 has been urged toward the web portion 18 and the included mounting bar has the resilient leg 10 in more pronounced curvature to snugly grip the adjacent surface thereof. In the position of FIG. 3, the inner end of the lower leg 12 may abut the adjacent surface of a toolbox or drawer and thus provide between that surface and the bar and web 18 an additional space for such articles as the purchaser may desire to temporarily store. Also, it will be noted that the key holding recess may be disposed below the handle with the outer surfaces of the upper leg 10 and the continuation 24 not materially beyond the handle for convenience in cartoning the box.

From the foregoing description, it will be understood that the clip type fastener of the present invention provides spaced legs for selective snap fitting attachment of pairs of such legs to handles or other supporting elements of various cross-sectional shapes with another leg serving a dual function as a positioning strut when the outer legs resiliently grip a handle or other supporting element of predetermined cross-sectional shapes and cooperating with one of the spaced outer legs to grip a support element of a generally smaller cross-sectional configuration. In all positions of mounting, the fastener presents a key or other article in accessible position for the user of the box or other article on which the fastener is mounted.

While certain forms of the invention have been shown and described, it is to be understood that various changes in details of construction and arrangement of parts may be made without departing from the spirit and scope of the invention as set forth in the appended claims.

What is claimed is:

1. A clip type fastener for resilient attachment to a supporting element, as a handle on a toolbox or toolbox drawer, comprising: a body portion having a recess for wedgingly receiving and holding an article, as a key or the like, in accessible position and a plurality of legs arranged in pairs and projecting therefrom in directions for attachment to a supporting element with the article holding recess in accessible position; said plurality including at least two pairs of legs with said legs being spaced in opposition to one another predetermined distances apart, whereby selective pairs of said legs are adapted for mounting the fastener to supporting elements of various cross-sectional configurations and said plurality cooperate to attach the fastener to a supporting element of a larger cross-sectional configuration.

2. A clip type fastener as claimed in claim 1, wherein the plurality of legs includes outer legs forming one selective pair for engaging supporting elements of larger predetermined cross-sectional configurations, with an intermediate shorter leg acting as a strut against the supporting element for stabilizing the mounted position of the fastener.

3. A clip type fastener as claimed in claim 2, wherein the outer legs have free edges flanged toward one another for gripping rear surface portions of the supporting element.

4. A clip type fastener as claimed in claim 1, wherein the plurality of legs include upper and lower outer legs with an intermediate shorter leg cooperating with one of the outer legs thereby forming a second selective pair for engaging supporting elements of smaller predetermined cross-sectional configurations leaving the other outer leg and article holding recess in substantially vertical juxtaposition to the supporting element.

5. A clip type fastener as claimed in claim 4, wherein the upper leg of the paired outer legs cooperates with the intermediate leg for engaging the supporting element and with the walls of the article holding recess inclined toward the free end of the lower leg to position the recess below the supporting element.

6. A clip type fastener as claimed in claim 5, wherein the upper leg is curved to present an inner concave surface and the lower leg is substantially straight with inner and outer walls of the recess inclined toward the free end of the lower leg to locate the recess below the intermediate leg.

7. A clip type fastener as claimed in claim 1, wherein the article holding recess is open-ended and bounded by inner and outer opposed wall portions with central portions for resiliently gripping an article therebetween.

8. A clip type fastener as claimed in claim 7, wherein one of the wall portions is provided with ramp surfaces to each side of the included central portion to facilitate insertion of an article into said recess.

9. A clip type fastener as claimed in claim 8, wherein the article holding recess extends longitudinally of the body portion and the inner and outer bounding walls are each provided with inwardly projecting central portions disposed at right angles to one another.

* * * * *